Oct. 21, 1941.  W. H. HARSTICK  2,259,887
SPEED INDICATOR
Filed July 25, 1939  4 Sheets-Sheet 1

Inventor
William H. Harstick.
By Paul O. Pippel
Atty.

Oct. 21, 1941.    W. H. HARSTICK    2,259,887
SPEED INDICATOR
Filed July 25, 1939    4 Sheets-Sheet 2
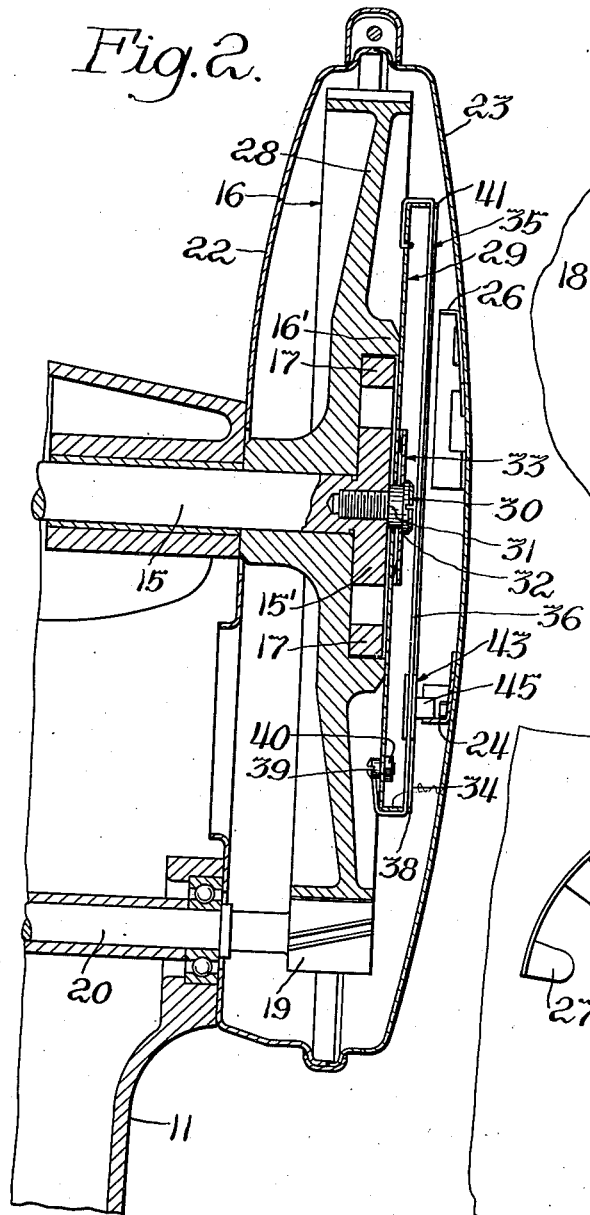
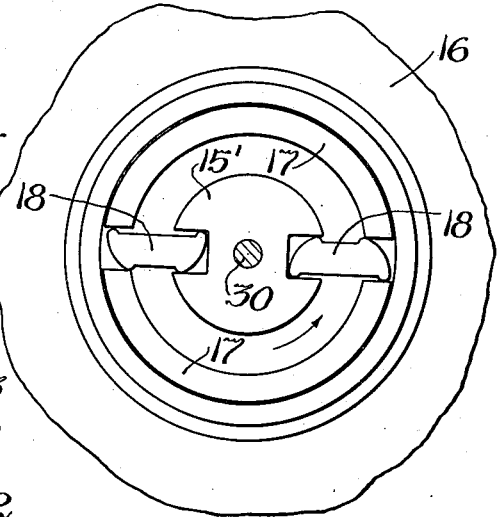
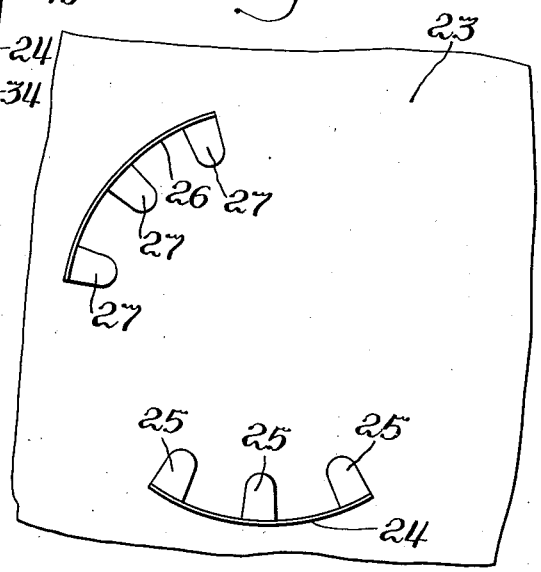
Inventor
William H. Harstick.
By Paul O. Pippel
Atty.

Oct. 21, 1941.  W. H. HARSTICK  2,259,887
SPEED INDICATOR
Filed July 25, 1939  4 Sheets-Sheet 3

Inventor
William H. Harstick
By Paul O. Pippel
Atty.

Oct. 21, 1941.   W. H. HARSTICK   2,259,887
SPEED INDICATOR
Filed July 25, 1939   4 Sheets-Sheet 4

Inventor
William H. Harstick
By Paul O. Pippel
Atty.

Patented Oct. 21, 1941

2,259,887

UNITED STATES PATENT OFFICE 2,259,887

SPEED INDICATOR

William H. Harstick, Milwaukee, Wis., assignor to International Harvester Company, a corporation of New Jersey Application July 25, 1939, Serial No. 286,374

13 Claims. (Cl. 116—74)

This invention relates to a speed indicator. More specifically it relates to an audible speed indicator for a cream separator.

It is well known that the maintenance of a uniform speed of a separator is a most important factor in the proper separation of milk and cream. Accordingly, some sort of speed indicator is required during operation of the separator, and this is especially true where the separator is operated by hand.

An object of the present invention is to produce an improved speed indicator.

Another object is the provision of an indicator which will accurately indicate the maintenance of a predetermined speed.

A further object is to provide a speed indicator which will indicate in different ways a permissible change of speed, speeds below that range, and speeds above that range.

The novel speed indicator of the present invention comprises a member mounted for reciprocation on a gear, the speed of which is to be indicated, and a part fixed to the casing enclosing the gear and positioned in the path of the member. The indicator functions in such a manner that for each rotation of the gear the member strikes the part twice below a certain range of speed, once during the range of speed, and not at all above the range of speed.

In the drawings,

Figure 2 is a section taken through the part of the separator to which the speed indicator is attached;

Figure 3 is a detail showing the clutch connecting the drive gear and a hand driven shaft;

Figure 4 is a detail showing a portion of a gear cover and members attached thereto forming part of the separator;

Figure 1:
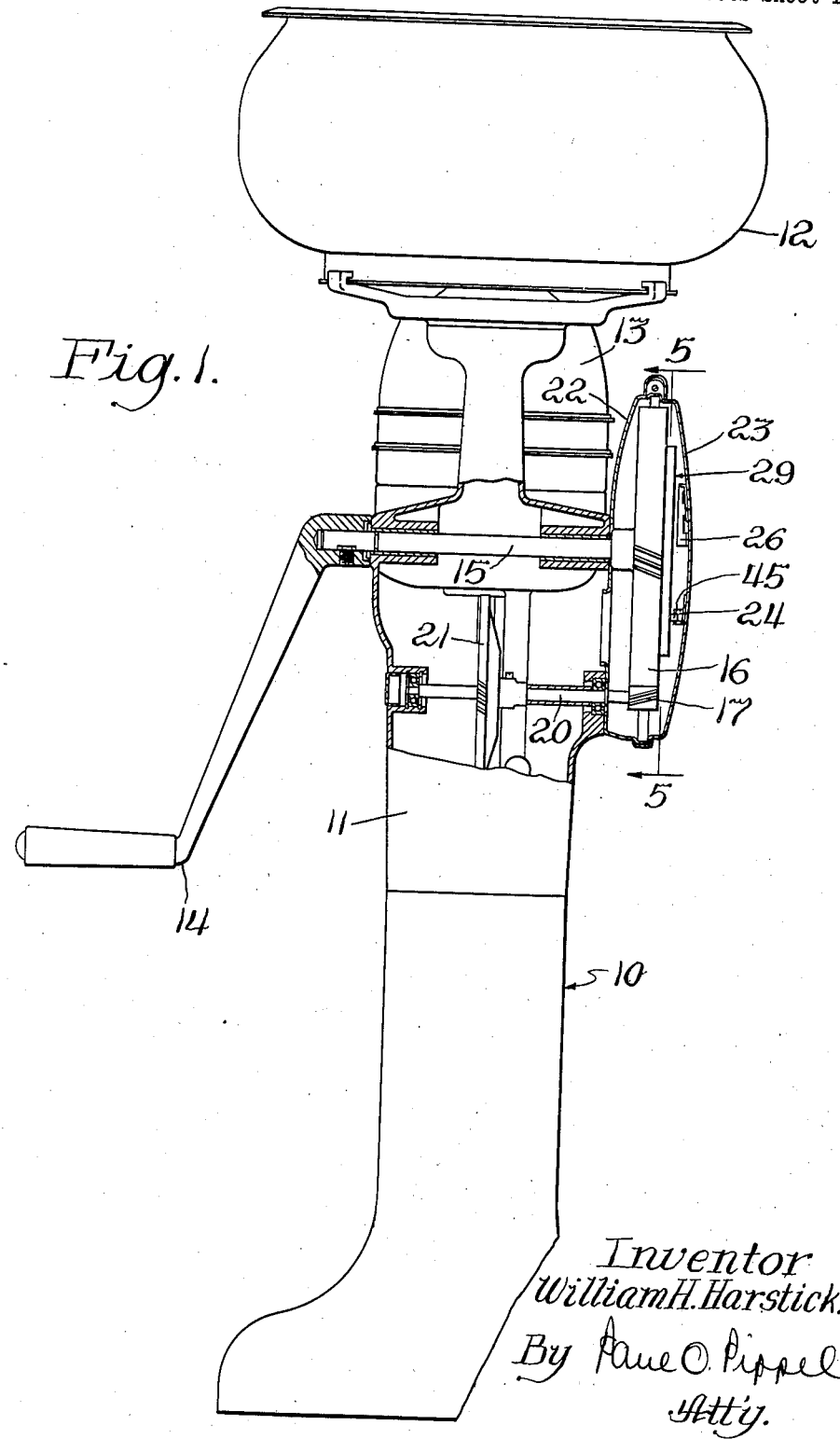
Figure 1 is a side elevation, partly in section, of a cream separator to which the speed indicator of the present invention is applied.
Figure 5:
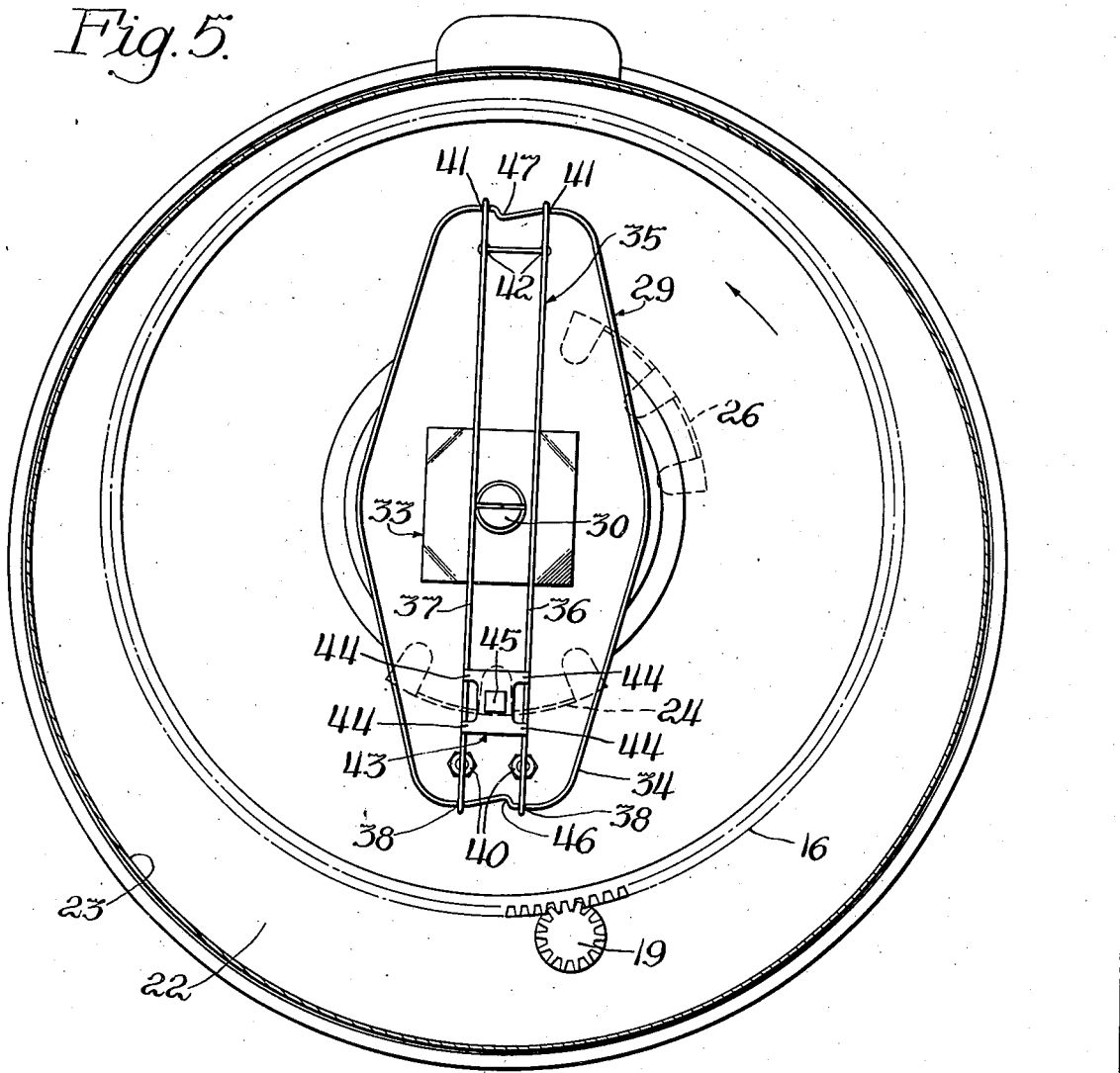
Figure 5 is a section taken along the line 5—5 of Figure 1.

A cream separator is designated by numeral 10 and comprises a frame 11, a supply can 12, the separator proper 13, hand crank 14, and drive shaft 15. As shown in Figures 1, 2 and 5, the drive shaft 15 drives a large gear 16 through a clutch composed of a recessed member 15' formed as an integral enlargement on the end of the shaft 15, half-ring members 17, dogs 18, and an extension on the gear 16 housing the members 17, in the form of a hub or flange 16'. This type of over-running clutch is well known in the art, and its operation is to permit the gear 16 to be driven by the shaft 15 and yet to prevent the gear from driving the shaft. The large gear 16 drives a small gear 19 which is mounted on and drives a shaft 20. The shaft 20 drives a helical gear 21 mounted thereon, which in turn operates gearing, not shown, connected with the separator proper 13. The effect of the above arrangement of parts is to transform the relatively slow speed of rotation of the crank 14 into a very high speed of rotation of the parts of the separator proper.

The gear 16 is enclosed within a casing composed of a pair of members, one member 22 being secured to the frame and the other member 23 being secured to the member 22. An arcuate member 24 is secured as by soldering or welding by means of feet 25 to the inside of the member 23 below the axis of rotation of the gear 16 and with its center substantially on the axis. A similar member 26 is similarly secured to the inside of the member 23 by feet 27 with its center also substantially on the axis of rotation of the gear 16. The member 26 is spaced between 90 degrees and 180 degrees from the member 24 in the direction of rotation of the gear, as will be observed from Figure 5. The member 24 and the member 26 may be termed, respectively, a strike sector and a release sector for reasons which will appear later.

A sheet metal plate 29 is held against the face of the gear 16 by means of a screw 30 threaded into the end of the shaft 15. A shoulder 31 rests against the enlargement 15'. A flange 32 on the shoulder holds a spring washer 33 against the plate 29. It is to be noted that the enlargement 15' and the half-ring members 17 are set in somewhat from the face of the gear 16 in the recess or housing formed by the flange 16'. Consequently, the screw 30 by its flange 32 and the spring washer 33 hold the plate 29 only against the gear flange 16'.

The sheet metal plate 29 has a peripheral flange 34 extending in a direction away from the gear 16. A guide-wire 35 is bent upon itself and is stretched across the length of the member 29 so as to constitute a pair of guide elements 36 and 37. The ends of the wire pass through notches 38 in the flange 34 and are secured on the back of the plate 29 by bolts 39 and nuts 40. The midportion of the wire passes through notches 41 in the flange 34 at the opposite end of the plate 29 to the back of the member and through openings 42 to the front. A member 43 is positioned between the guide elements 36 and 37, sliding therealong on spaced legs 44 having grooves therein receiving the elements 36 and 37.

The member 43 has a projection 45 of square section extending therefrom so as to be in a position to contact the strike sector 24 and the release sector 26 as the member passes along the guide elements 36 and 37. The portions of the flanges between the ends of the elements 36 and 37 are pressed inwardly, as at 46 and 47, so as to constitute stops for the member 43. The effective portion of the stop 46 is closer to the element 36 than to the element 37, and the stop 47 is closer to the element 37. The element 36 is offset from the axis of rotation of the gear 16 or the center line of the shaft 15 a greater amount than is the element 37.

Figure 6:
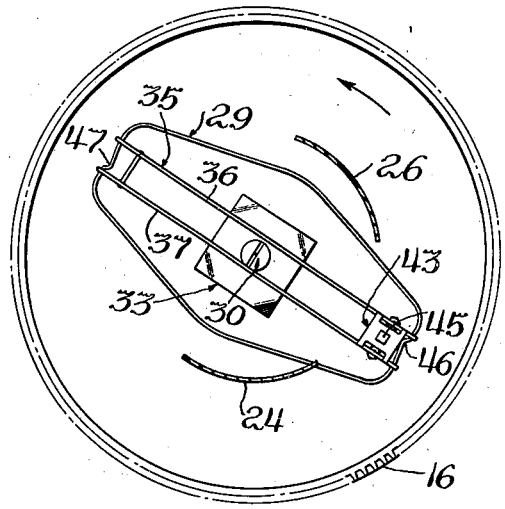
Figures 6, 7, 8 and 9 are views similar to Figure 5, illustrating the manner of operation of the novel speed indicator.
Figure 7:
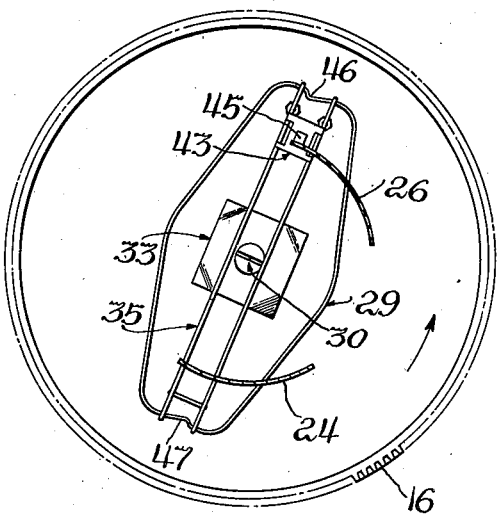
Figure 8:
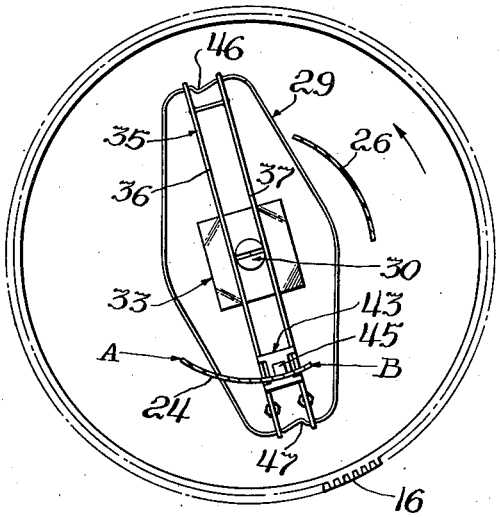

The operation of the parts just described is as follows:

Assume that the point of starting is as shown in Figure 6 and the direction of rotation is counter-clockwise. The member 43 is at the lower end of the elements 36 and 37, resting against the stop 46. As the elements pass the horizontal, the member 43 tends to slide toward the opposite end of the elements 36 and 37, but is prevented from so doing because the projection 45 contacts the release sector 26. As the gear 16 continues to rotate, the member 43 is held near the upper end of the elements 36 and 37 until the position shown in Figure 7 is reached with the projection 45 at the end of the release sector 26. An instant later, the member 43 falls toward the stop 47 at the other end of the wire elements 36 and 37. As it falls, the projection 45 strikes the strike sector 24, causing an audible click to be emitted. Because some time is required for the fall of the member 43 from the release sector 26 to the strike sector 24, the gear will have passed through an angle as represented by the change in angle of the guide elements 36 and 37 in Figures 7 and 8. Continued rotation brings the parts to a position similar to that of Figure 6 with the member 43 resting against the stop 47 instead of the stop 46. Further rotation causes the member 43 to be held by the release sector 26 adjacent the stop 47, as shown in Figure 7. Then, the member 43 falls toward the stop 46, the projection striking the strike sector 24, causing an audible sound to be emitted. Finally, the parts will reach the original position of Figure 6 with the member 43 resting against the stop 46. In the revolution just completed the projection 45 has struck the strike sector 24 twice, and two audible clicks have been emitted.

Figure 9:
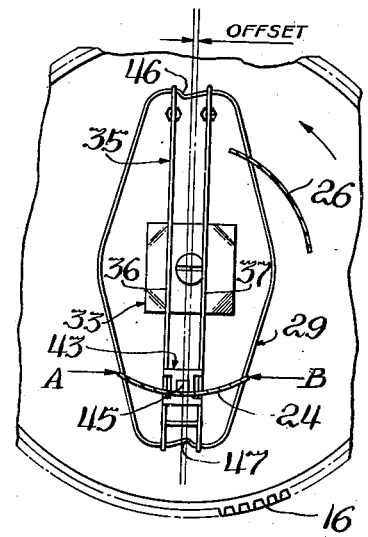

As has been stated, the gear passes through an angle of travel during the fall of the member 43 from the release sector 26 to the strike sector 24. As the speed increases, the angle becomes greater, and the projection 45 strikes the member 24 closer to the end B. Finally, the speed increases to a point where the projection 45 misses the strike sector 24 altogether. However, for a small increase of speed, the projection misses the strike sector only on one half revolution, striking the sector on the other half revolution, because the guide elements 36 and 37 are spaced unequal amounts from the axis of rotation. As shown in Figures 5 and 9, the guide element 36 is offset from the axis of rotation more than is the element 37. Thus, as the member 43 falls toward the stop 47, the projection 45 strikes the strike sector 24 closer to the end A than it does when it falls toward the stop 46. When the proper speed is reached, the projection 45 just misses the end B of the strike sector 24 on the fall toward the stop 46 and strikes the end B on the fall toward the stop 47. Finally, as the speed increases sufficiently, the projection 45 misses the sector 24 on each half revolution. Thus, no sound is emitted. In brief, there are two clicks emitted per revolution for speeds up to a certain range; within a narrow range, there is one click per revolution; above the range, there are no clicks. The smaller the difference in spacing of the elements 36 and 37 from the axis of rotation, the smaller the range within which one click is emitted per revolution. The position or arcuate length of the strike sector 24 may be so regulated that the critical speed at which the cream separator is to be run may be the narrow range of speed in which only one click per revolution is emitted or just beyond the narrow range where no clicks are heard.

As previously stated, the projections 46 and 47 are spaced different amounts from the guide elements 36 and 37. The result is that the center of gravity of the member 43 is not directly over the projections when it strikes, and the member tends to twist or cock slightly as it strikes, so that it binds slightly between the guide-wires and is prevented from bouncing. It was discovered that, when the projections were in line with the center of gravity of the member 43, the member often bounced sufficiently to interfere with proper operation of the speed indicator.

It is to be noted that the plate 29 is only frictionally secured to the gear 16. This arrangement prevents damage to the indicator in case the member 43 should fall during some condition of operation at such a position on the guide elements 36 and 37 as to bring the projection 44 exactly opposite to and in engagement with the sectors 24 and 26. In such a case, the wire might be broken if the plate 29 were fixedly secured to the gear 16. With the plate only frictionally secured to the gear, the plate 29 will slip if the projection strikes the sector 24 or sector 26.

It is to be noted that the projection 45 is square or, at least, rectangular in section rather than round. The result is that the point at which the member 43 drops from the release sector 26 stays more nearly constant. With a circular projection or a projection without angular corners, there is a tendency to wear and accordingly change in the position at which the member falls.

It will be apparent from the above description that a new and novel speed indicator has been provided. Although the indicator as illustrated is applied to a cream separator, it is perfectly obvious that it may be used with other devices. Its mode of operation has been illustrated as producing audible signals as an indication of speed, but it is within the scope of the invention to produce other than audible signals.

The intention is to limit the invention only within the scope of the appended claims.

What is claimed is:

1. A speed indicator comprising a rotating part, a first member mounted for reciprocation along a line rotating with the part and approximately intersecting the axis of rotation at a substantial angle thereto, a second stationary member fixed against movement and spaced from and beneath the axis of rotation an amount less than the first member has movement away therefrom so as to be contacted on its side toward the axis of rotation by the first member during its reciprocation, and a third stationary member spaced from the second member between 90 degrees and 180 degrees measured in the direction of rotation and from the axis of rotation an amount less than the first member has movement therefrom so as to be contacted on its side away from the axis of rotation by the first member.

2. The indicator as set forth in claim 1, the line of reciprocation of the first member being slightly offset from an intersection with the axis of rotation.

3. A speed indicator comprising a rotating part, a stationary part adjacent the rotating part, a pair of arcuate members secured to the side of the stationary part toward the rotating part and having their centers approximately coincident with the axis of rotation of the rotating part and being separated from one another between 90 degrees and 180 degrees measured in the direction of rotation of the rotating part, a pair of guide elements secured to the face of the rotating part toward the stationary part in parallel spaced relation on opposite sides of the center of rotation and extending in both directions therefrom somewhat farther than the distance from the axis of rotation to the arcuate members, stop means positioned at opposite ends of and between the guide elements, and a member slidably mounted on and positioned between said guide elements and having a portion projecting sufficiently to contact the arcuate members.

4. The indicator as set forth in claim 3, one guide element being offset from the center of rotation a greater amount than the other guide element.

5. The indicator as set forth in claim 3, the stop means at one end of the guide elements being closer to one guide element than the other.

6. The indicator as set forth in claim 3, the guide elements being unequally spaced from the axis of rotation, the stop means at one end of the guide elements being closer to one guide element than the other.

7. An indicator comprising a rotating part, a support frictionally secured to the rotating part, a pair of guide elements secured to the support in spaced parallel relation on opposite sides of the axis of rotation, stop means at the ends of the guide elements, a member slidably mounted on and positioned between said guide elements and having a projecting portion, a fixed part, a first arcuate member secured to the fixed part beneath the axis of rotation with its center substantially thereon and spaced therefrom an amount less than the distance between the stop means and the axis of rotation so as to be contacted by the member, and a second arcuate member also secured to the fixed part with its center substantially on the axis of rotation and spaced therefrom an amount less than the distance between the stop means and the axis of rotation and from the first arcuate member 90 degrees to 180 degrees in the direction of rotation so as to be contacted by the member.

8. The indicator as set forth in claim 7, the fixed part forming at least part of means inclosing the rotating part and serving to produce an audible signal as a result of contact of the slidably mounted member with the first arcuate member.

9. A speed indicator comprising a rotating part, a support thereon, spaced parallel wires extending across the support, a member slidably mounted on the wires and having a projecting portion of rectangular section, a stationary member, and release and strike sectors secured to the stationary member and extending toward the rotating member so as to be contacted by the projecting portion of the slidably mounted member.

10. A speed indicator comprising a rotating part, guiding means secured thereto, a member slidably mounted on the guiding means, a stationary part, a strike sector extending from the stationary part toward the rotating part below its axis of rotation, and a release sector extending from the stationary part toward the rotating part and spaced from the strike sector between 90 degrees and 180 degrees in the direction of rotation of the rotating part.

11. A speed indicator comprising a rotating part, a support releasably held against angular movement with respect to the rotating part, guide means extending across the support, a member slidably mounted on the guide means, a stationary part, and strike and release elements extending from the stationary part toward the rotating part so as to be contacted by a portion of the member in its travel along the guide means, the releasable securement of the support to the rotating part preventing damage in the event of the slidably mounted member's engaging the edge of the sectors.

12. A speed indicator comprising a rotatable part, means mounted on the rotatable part for rotation therewith and comprising a guideway extending along a line approximately intersecting the axis of rotation at approximately a right angle thereto and rotating with the part and stop means at the ends of the guideway, a member mounted on the guideway for reciprocation along the rotating line through and on both sides of the point on the line nearest the axis of rotation and being limited in its reciprocation in each direction by the stop means, a fixed part mounted at a distance from the axis of rotation of the rotatable part less than the distance of the stops from the axis and positioned to be struck by the member at least once each revolution within a predetermined speed range.

13. The indicator as set forth in claim 12, the rotating line of reciprocation of the member being slightly offset from an intersection with the axis of rotation.

WILLIAM H. HARSTICK.